United States Patent
Yan et al.

(10) Patent No.: US 8,102,420 B2
(45) Date of Patent: Jan. 24, 2012

(54) PORTABLE DIGITAL PHOTOGRAPHING SYSTEM COMBINING POSITION NAVIGATION INFORMATION AND IMAGE INFORMATION

(76) Inventors: Yuejun Yan, Shenzhen (CN); Yuepeng Yan, Shenzhen (CN)

( * ) Notice: Subject to any disclaimer, the term of this patent is extended or adjusted under 35 U.S.C. 154(b) by 975 days.

(21) Appl. No.: 12/053,660

(22) Filed: Mar. 24, 2008

(65) Prior Publication Data
US 2008/0231697 A1  Sep. 25, 2008

(30) Foreign Application Priority Data

Mar. 24, 2007 (CN) .......................... 2007 1 0073659
Feb. 27, 2008 (CN) .......................... 2008 1 0082450

(51) Int. Cl.
*H04N 7/18* (2006.01)
*G06F 12/00* (2006.01)
(52) U.S. Cl. ....................................................... 348/113
(58) Field of Classification Search .................. 348/113, 348/373, 231.2
See application file for complete search history.

(56) References Cited

U.S. PATENT DOCUMENTS

| | | | | |
|---|---|---|---|---|
| 5,815,411 A | * | 9/1998 | Ellenby et al. | 702/150 |
| 6,525,768 B2 | * | 2/2003 | Obradovich | 348/231.99 |
| 6,657,661 B1 | * | 12/2003 | Cazier | 348/231.2 |
| 2006/0066752 A1 | * | 3/2006 | Kelliher | 348/373 |
| 2008/0295010 A1 | * | 11/2008 | Bobbitt | 715/764 |

* cited by examiner

*Primary Examiner* — Zarni Maung
(74) *Attorney, Agent, or Firm* — Matthias Scholl P.C.; Matthias Scholl

(57) ABSTRACT

Taught is a portable digital photographing system combining position navigation information and image information, wherein the position navigation information and the captured image information is combined and processed by a digital signal processing unit. The combined information then is stored in a register and displayed through an interface circuit. The portable digital photographing system can merge the location, time, and position information into the image or video. In addition, an electronic map corresponding to a position navigation information can be displayed on a display monitor.

20 Claims, 4 Drawing Sheets

PORTABLE DIGITAL PHOTOGRAPHING SYSTEM COMBINING POSITION NAVIGATION INFORMATION AND IMAGE INFORMATION

BACKGROUND OF THE INVENTION

1. Field of the Invention

The invention relates to the fields of electronic devices, digital home appliances, navigational positioning, electronic imaging, etc., and specifically, to a portable digital photographing system combining position navigation information and image information.

2. Description of the Related Art

Mobile camera phones, standalone digital cameras, and video recorders are ubiquitous in the modern world.

It is generally preferable to include location and time information with pictures or videos taken for future review, reference or description. On the other hand many camera users wish to obtain traffic and position information even when not taking pictures. However, conventional standalone digital cameras, and video recorders do not offer this function.

SUMMARY OF THE INVENTION

To realize the combination of position navigation function and portable digital photographing function, in one aspect of the invention, provided is a portable digital photographing system combining the position navigation information and the image information.

To achieve the objective of the invention, provided is a portable digital photographing system combining navigation information and image information, comprising: a portable digital photographing apparatus and a position information receiver capable of displaying the captured position information on the display screen of the portable digital photographing apparatus.

In certain embodiments of the invention, the position information receiver has or is combined with one or more functional units of a GPS receiver, or a Galileo receiver, or a ground positioning receiver.

In certain embodiments of the invention, the portable digital photographing apparatus is a portable digital camera or a portable digital video recorder.

In certain embodiments of the invention, the portable digital photographing system further comprises a position resolving and image digital signal processing unit.

In certain embodiments of the invention, position information received by the position information receiver is processed by the position resolving and image digital signal processing unit, and then is stored and output to an interface circuit and/or is displayed on the display screen of the portable digital photographing apparatus.

In certain embodiments of the invention, the position resolving and image digital signal processing unit processes the image information captured by the portable digital photographing apparatus; the processed image information is then stored and output to an interface circuit and/or is displayed on the display screen of the portable digital photographing apparatus.

In certain embodiments of the invention, the position resolving and image digital signal processing unit processes the position information received by the position information receiver and the image information captured by the portable digital photographing apparatus at the same time to get a combined information; the combined information is then stored and output to an interface circuit and/or is displayed on the display screen of the portable digital photographing apparatus.

In certain embodiments of the invention, the portable digital photographing system combining the position navigation information and image information also comprises a position and image information register, wherein the position and image information register stores the position information received by the position information receiver, the image information captured by the portable digital photographing apparatus, and/or the combined information from the position resolving and image digital signal processing unit.

In certain embodiments of the invention, the portable photographing apparatus comprises a camera head, an image signal processing circuit, an analog-to-digital converter, and a display monitor, wherein the position resolving and image digital signal processing unit is connected with the position information receiver, the analog-to-digital converter and the display monitor of the portable photographing apparatus.

In certain embodiments of the invention, the position resolving and image digital signal processing unit and the position and image information register are embedded inside of the position information receiver, wherein the position resolving and image digital signal processing unit is connected with the portable digital photographing apparatus via an interface circuit.

In certain embodiments of the invention, the position resolving and image digital signal processing unit and the position and image information register are embedded in the portable digital photographing apparatus, wherein the position resolving and image digital signal processing unit is connected with the position information receiver via an interface circuit.

In certain embodiments of the invention, the position resolving and image digital signal processing unit and the position and image information register can be combined as one independent module, wherein the independent module exchanges and processes data with the portable digital photographing apparatus and the position information receiver via an interface circuit.

In certain embodiments of the invention, the portable digital photographing system is loaded with electronic maps, wherein the position information received by the position information receiver can be displayed in accordance with the correspondent electronic map via the display screen of the portable digital photographing apparatus.

In certain embodiments of the invention, the position information receiver comprises further a 1 pps port (one pulse per second port) for providing 1 pps signal, wherein the 1 pps signal of the position information receiver serves as time synchronous clock for the portable digital photographing system.

In certain embodiments of the invention, the position resolving and image digital signal processing unit further comprises an encryption unit for encrypting data to avoid any unwanted data modification.

As a result, the invention provides the following general advantages:

1) location, time, and position information is included with an image or video for future recall, review, or description;
2) navigation and position information is displayed in connection with electronic maps for transportation purposes;
3) the combination of the three processing units (position resolving, image digital signal processing, and encryption units) allows for unique functionality;

4) the application of 1 pps data allows the combination of high resolution images with location, time, and position information; and
5) location, time, and position information is combined with an image and encrypted to assure data safety.

Figure 1:
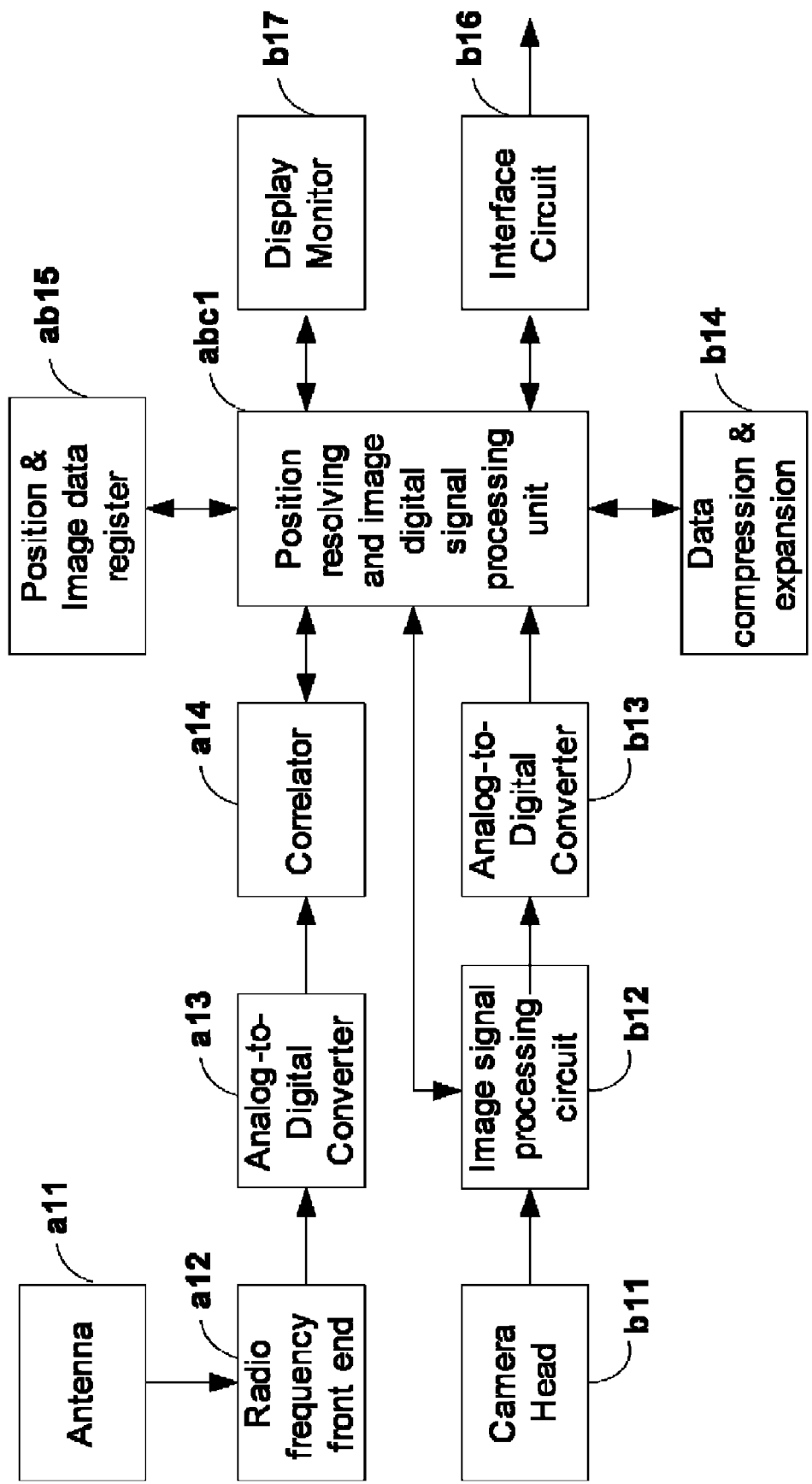
FIG. 1 illustrates a combined structure of a portable digital photographing system according to one embodiment of the invention.

Legend: position resolving digital signal processor—a1; antenna—a11; radio frequency front end—a12; analog-to-digital converter—a13; received signal correlator—a14; position and image information register/position data register—a15; interface circuit—a16; position information receiver—a101; digital signal processing and controlling unit—b1; portable digital photographing apparatus—b10; camera head—b11; image signal processing circuit—b12; analog-to-digital converter—b13; data compression and expansion unit—b14; position and image information register—b15; interface circuit/interface circuit of information data—b16; display monitor—b17; portable digital photographing apparatus—b101; portable digital photographing apparatus—b102; position resolving and image digital signal processing unit—c1; independent module—c10; interface circuit connected with the position information receiver—c11; position and image information register—c12; and output interface circuit—c13; combined position and image information register of portable digital photographing apparatus and position information receiver—ab15; position resolving and image digital signal processing unit for both portable digital photographing apparatus and position information receiver—abc1; position resolving and image digital signal processing unit—ac1; position resolving and image digital signal processing unit—bc1.

DETAILED DESCRIPTION OF THE INVENTION

The portable digital photographing system combining position navigation information and image information comprises a portable digital photographing apparatus and a position information receiver capable of displaying captured position information on the display screen of the portable digital photographing apparatus. When photographing, the position information received by the position information receiver can be stored and displayed in the image or video taken by the portable digital photographing apparatus. The position information receiver has or is combined with one or more the functions of GPS receiver, Galileo receiver, or any other ground positioning receiver. The ground positioning receiver can be a receiver for receiving position information from a mobile phone cell, which is usually a simple position information. The portable digital photographing apparatus can be a portable digital camera or a portable digital video recorder.

The portable digital photographing system further comprises a position resolving and image digital signal processing unit. When the portable digital photographing system is being used as a navigation terminal, the position resolving and image digital signal processing unit processes the position information received by the position information receiver. The processed information then is stored and output to the interface circuit and/or is displayed on the display screen of the portable digital photographing apparatus.

When the portable digital photographing system is being used as a photographing terminal, the position resolving and image digital signal processing unit processes the image information received by the portable digital photographing apparatus, the processed information then is stored and output to the interface circuit and/or is displayed on the display screen of the portable digital photographing apparatus.

When the portable digital photographing system is being used as both navigation terminal and photographing terminal, the position resolving and image digital signal processing unit processes and integrates the position information received by the position information receiver and the image information captured by the portable digital photographing apparatus. The combined information then is stored and output to the interface circuit and/or is displayed on the display screen of the portable digital photographing apparatus.

The portable digital navigation photographing system combining position navigation information and image information is loaded with electronic maps. Therefore, the position information received by the position information receiver can be displayed on the display screen of the portable digital photographing apparatus in combination with the correspondent electronic map, so that the portable digital photographing system can be used as a portable navigation terminal.

FIG. 1 illustrates the first embodiment of the portable digital photographing system, wherein the function of position navigation is added to the image or video taken by the portable digital camera or digital video recorder. With the powerful digital signal processing and controlling units, and by combining the digital position information and image information, the combined information containing all or part of the information of position, navigation, time, map information, and image information is stored in a high capacity register, and is then output via the information data interface circuit.

The combination processing of the portable digital photographing system is described hereinafter in more detail. When combining information, the light signal collected by the sensor of the camera head b11 of the portable digital photographing apparatus is converted into a digital signal via analog-to-digital converter b13 through the photoelectric converter circuit and image signal processing circuit b12. The digital signal is then transmitted to the position resolving and image digital signal processing unit abc1 for both portable digital photographing apparatus and position information receiver via data compression and expansion circuit b14. After being mixed, filtered, and amplified by a converter of the radio frequency front end a12, the radio frequency position information signal received by the antenna a11 is converted into a digital signal via the analog-to-digital converter a13. Then, the digital signal is calculated by the received signal correlator a14 so as to realize signal trapping, tracing, and position resolving with the position resolving and image digital signal processing unit abc1. Then, the signal processing unit abc1 integrates the position information and image digital signal, stores the combined information in the position and image information register ab15, outputs it through the information data interface circuit b16, and at the same time, the combined information is displayed on the display monitor b17.

In a specific application, the combination of position information data with information on the electronic map can form characteristic information in the image or video. With the combination of position information data and the data information image of the electronic map, a name best reflecting the photographing location is selected and is combined automatically with the image information. For example, when photographing at the Beijing Tian'anmen Square, besides the time and geographic location, the wording "Tian'anmen Square" will also be displayed in the picture or video.

Besides, by utilizing its own display monitor of the portable digital camera or digital video recorder, the electronic map software can be loaded into the portable digital photographing system combining the position navigation information and image information. The correspondent electronic map in accordance with the position information received by the position information receiver can then be brought up by opening the electronic map function key of the apparatus, so that road traffic navigation and position information can be obtained.

In order to integrate accurately the position information and image information, time and sequence should be synchronized when processing and controlling the entire system signal. For this purpose, a precise time output port namely, the 1 pps data port, is set in the position information receiver. By utilizing the 1 pps port as the time synchronous clock, the relevant components and circuits of the entire apparatus can be controlled and the signal can be processed synchronously, so that precise time and location information can be included in the image or video information.

In certain special applications such as in police or exploration application, the content recorded by the portable photographing system of the invention should not be modified or changed. The content can be combined and encrypted in the position resolving and image information digital signal processing unit, so that any modification to the location, time, or position information of the image or video is prevented.

The portable digital photographing apparatus comprises but not limited to three processing units: the position resolving and image information digital signal processing unit; the combined information data register; and the interface circuit. The combined structure of the three combination processing units is shown in FIG. 1.

The image information of the portable digital photographing apparatus and the data information received by the position information receiver are combination processed in the position resolving and image information digital signal processing unit abc1, the combined information then is stored in the register ab15, output through the interface circuit b16, and displayed through the display monitor b17.

Figure 2:
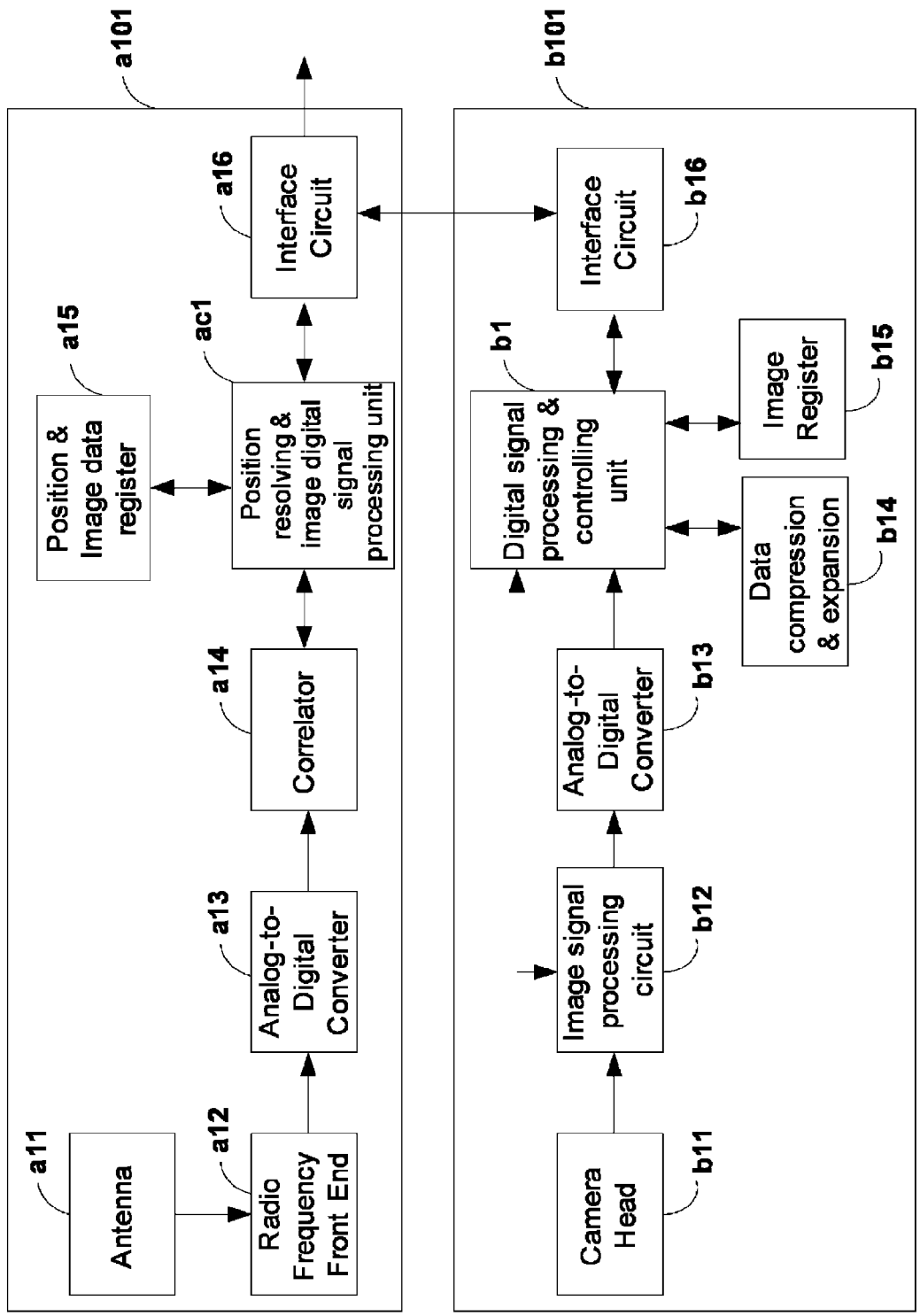
FIG. 2 is a schematic diagram of the portable digital photographing system according to a first embodiment of the invention.

FIG. 2 illustrates another embodiment of the portable digital photographing system combining position information and image information. Namely, the three combination processing units are embedded into the position information receiver.

When the three combination processing units are embedded in the position information receiver, the portable digital photographing system comprises a position information receiver a101 and a portable photographing apparatus b101. The position information receiver a101 comprises an antenna a11, a radio frequency front end a12, an analog-to-digital converter a13, a received signal correlator a14, a position resolving and image digital signal processing unit ac, a register a15, and an interface circuit a16. The portable photographing apparatus b101 comprises a camera head b11, an image signal processing circuit b12, an analog-to-digital converter b13, a data compression and expansion b14, an image register b15, an interface circuit b16.

The position resolving and image information digital signal processing unit of the position navigation information and portable digital photographing apparatus, the correspondent data register, and the interface circuit are embedded in the position information receiver. Through the position resolving and image information digital signal processing unit ac, the position information and image information is combined, and is then stored in the register ab15. The combined information is then output through the information data interface circuit a16, and at the same time, the position information, image information, and/or the combined information is displayed or recorded through the display monitor.

Figure 3:
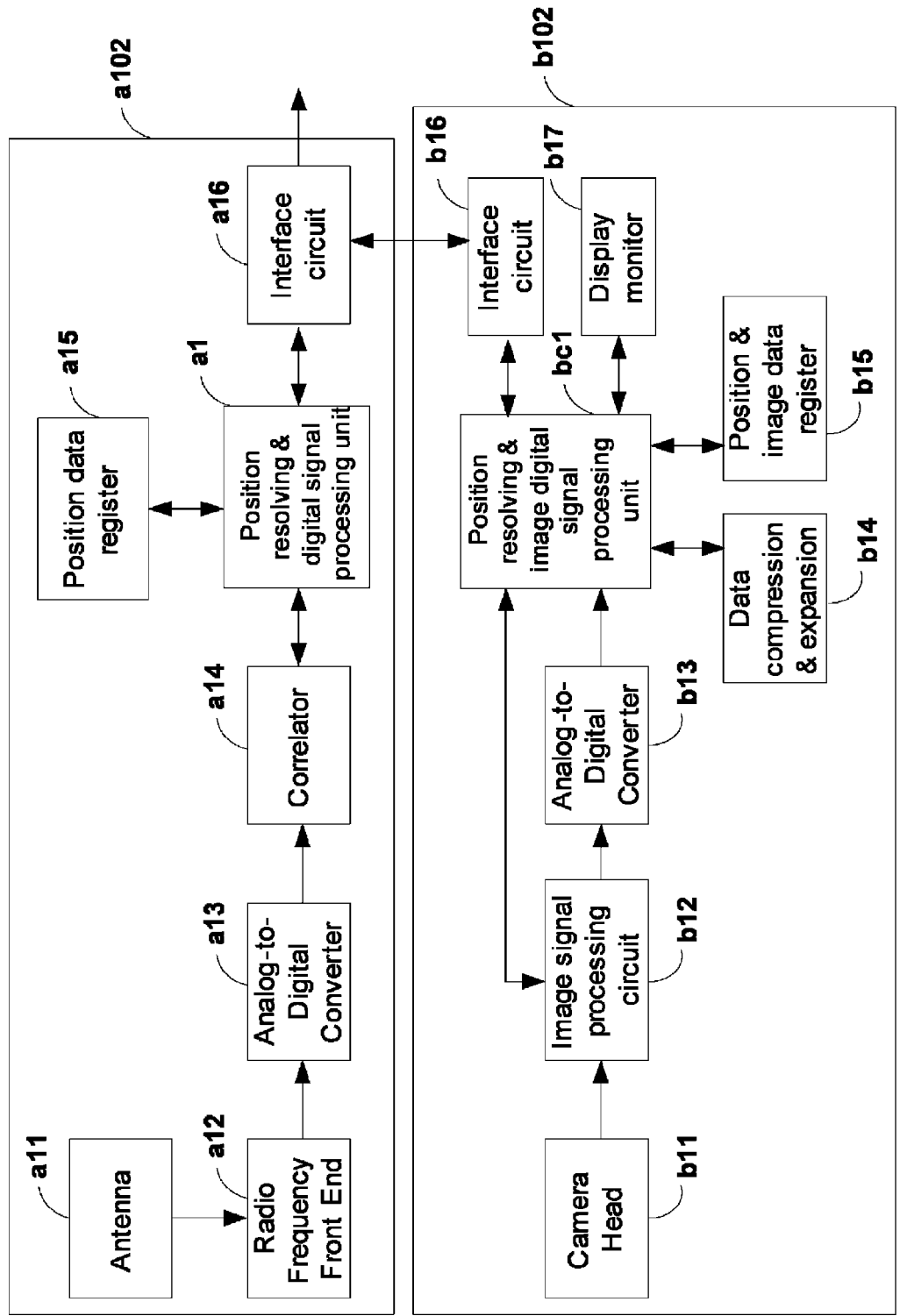
FIG. 3 is a schematic diagram of the portable digital photographing system according to a second embodiment of the invention.

FIG. 3 illustrates another embodiment of the portable digital photographing system combining position information and image information. Namely, the three combination processing units are embedded into the portable digital photographing apparatus.

When the three combination processing units are embedded in the portable digital photographing apparatus, the portable digital photographing system comprises a position information receiver a102 and a portable photographing apparatus b102. The position information receiver a102 comprises an antenna a11, a radio frequency front end a12, an analog-to-digital converter a13, a received signal correlator a14, a position resolving and image digital signal processing unit a1, a register a15, and an interface circuit a16. The portable photographing apparatus b102 comprises a camera head b11, an image signal processing circuit b12, an analog-to-digital converter b13, a data compression and expansion b14, an image register b15, an interface circuit b16, and a position resolving and image digital signal processing unit bc1.

The position resolving and image information digital signal processing unit of the position navigation information and portable digital photographing apparatus, the correspondent position and image information register, and the interface circuit are embedded in the portable digital photographing apparatus. Through the position resolving and image information digital signal processing unit bc1, the position information and image information is combined, and then is stored in the register b15. The combined information is then output through the information data interface circuit b16, and at the same time, the position information, image information, and/or the combined information is displayed or recorded through the display monitor b17.

Figure 4:
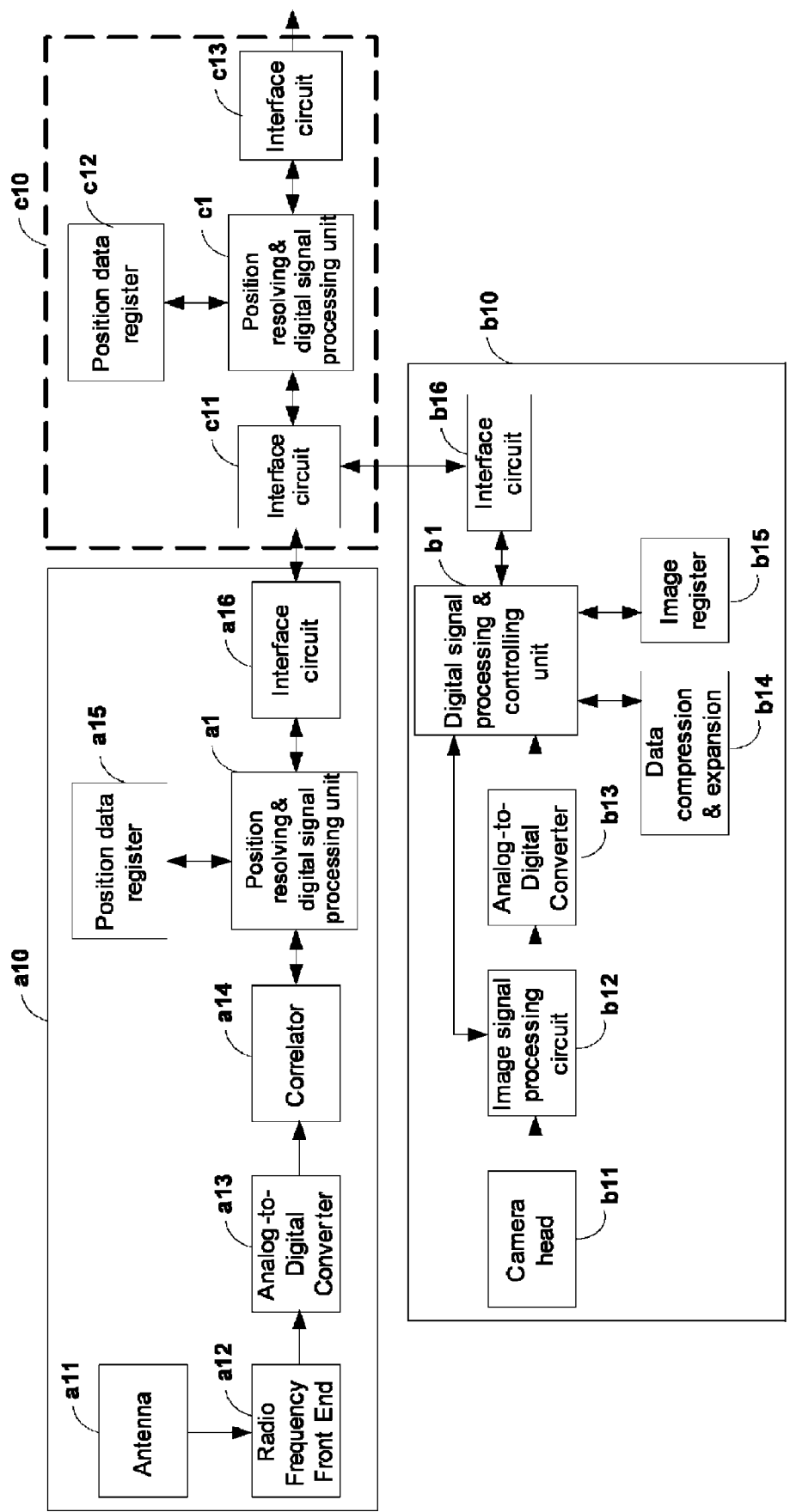
FIG. 4 is a schematic diagram of the portable digital photographing system according to a third embodiment of the invention.

FIG. 4 illustrates another embodiment of the portable digital photographing system combining position information and image information. Namely, the three combination processing units are combined as an independent module outside of the portable digital photographing apparatus and the position information receiver.

When the three combination processing units are combined as an independent module outside of the portable digital photographing apparatus and the position information receiver, the portable digital photographing system comprises a position information receiver a10, a portable photographing apparatus b10, and an independent module c10.

The position information receiver a10 comprises an antenna a11, a radio frequency front end a12, an analog-to-digital converter a13, a received signal correlator a14, a position resolving and image digital signal processing unit a1, a position data register a15, and an interface circuit a16. The portable photographing apparatus b10 comprises a camera head b11, an image signal processing circuit b12, an analog-to-digital converter b13, a data compression and expansion b14, an image register b15, an interface circuit b16, and a digital signal processing and controlling unit b1. The independent module c10 comprises a position resolving and image digital signal processing and controlling unit c1, an interface c11 connected with the position information receiver, a combined position and image information register c12, and an output interface circuit c13.

The position resolving and image information digital signal processing unit c1 of the position navigation information and portable digital photographing apparatus, the position and image information register c12, and the interface circuits c1 and c13 are combined as an independent module outside of the portable digital photographing apparatus and the position information receiver. Through the position resolving and image information digital signal processing unit c1, the position information and image information is combined, then is stored in the register c12, and is output through the information data interface circuit c13.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A portable digital photographing and positioning apparatus for combining position navigation information and image information, comprising
    a portable digital photographing apparatus having a display screen; and
    a position information receiver for capturing position and navigation information;
    wherein
    the captured position and navigation information is displayed on said display screen.

2. The apparatus of claim 1, wherein said position information receiver functions as a GPS receiver, a Galileo receiver, or a ground position receiver.

3. The apparatus of claim 1, wherein said portable digital photographing apparatus is a portable digital camera or a portable digital video recorder.

4. The apparatus of claim 1, further comprising a position resolving and image digital signal processing unit.

5. The apparatus of claim 4, wherein
    said position resolving and image digital signal processing unit processes the position and navigation information received by said position information receiver, and outputs processed information to a register, an interface circuit, and/or said display monitor.

6. The apparatus of claim 4, wherein
    said position resolving and image digital signal processing unit processes the image information captured by said portable digital photographing apparatus, and outputs processed information to a register, an interface circuit, and/or said display monitor.

7. The apparatus of claim 4, wherein said position resolving and image digital signal processing unit combines the position and navigation information received by said position information receiver and the image information captured by said portable digital photographing apparatus to obtain a combined information, and outputs the combined information to a register, an interface circuit, and/or said display monitor.

8. The apparatus of claim 7, further comprising a position and image data register, which stores the position and navigation information received by said position information receiver, the image data captured by said digital photographing apparatus, and/or the combined information from said position resolving and image digital signal processing unit.

9. The apparatus of claim 4, wherein
    said portable photographing apparatus comprises a camera head, a image signal processing circuit, an analog-to-digital converter and display monitor;
    said position information receiver comprises an antenna, a radio frequency front end, an analog-to-digital converter, and a received signal correlator; and
    said position resolving and image digital signal processing unit is connected with the received signal correlator of said position information receiver, the analog-to-digital converter of said portable digital photographing apparatus, and the display monitor.

10. The apparatus of claim 9, wherein
    said position resolving and image digital signal processing unit and said position and image data register are embedded inside of said position information receiver; and
    said position resolving and image digital signal processing unit is connected with said portable digital photographing apparatus via the interface circuit.

11. The apparatus of claim 9, wherein
    said position resolving and image digital signal processing unit and said position and image data register are embedded inside of said portable digital photographing apparatus; and
    said position resolving and image digital signal processing unit is connected with said portable position information receiver via the interface circuit.

12. The apparatus of claim 9, wherein
    said position resolving and image digital signal processing unit and said position and image data register are combined as an independent module; and
    said independent module exchanges and processes data with said portable digital photographing apparatus and said position information receiver via the interface circuit.

13. The apparatus of claim 1, wherein said apparatus is loaded with electronic maps, the position and navigation information received by the position information receiver then can be displayed through the display screen in accordance with the correspondent electronic map.

14. The apparatus of claim 1, further comprising a 1 pps data port serving as a synchronous clock.

15. The apparatus of claim 4, wherein said position resolving and image digital signal processing unit offers the function of encryption.

16. A portable digital photographing and positioning apparatus for combining position navigation information and image information, comprising
    a portable digital photographing apparatus having a display screen;
    a position information receiver for capturing position information at location of said portable digital photographing apparatus and for capturing navigation information around the location; and a position resolving and image digital signal processing unit;

wherein said position resolving and image digital signal processing unit processes the position and navigation information received by said position information receiver, and outputs processed information to a register, an interface circuit, and/or said display monitor; and the portable digital photographing and positioning apparatus is loaded with an electronic map software, the position and navigation information is then displayed through said display screen in accordance with the correspondent electronic map.

17. The apparatus of claim 16, wherein said position resolving and image digital signal processing unit processes the image information captured by said portable digital photographing apparatus, and outputs processed information to a register, an interface circuit, and/or said display monitor.

18. The apparatus of claim 16, wherein said position resolving and image digital signal processing unit processes the image information captured by said portable digital photographing apparatus, and combines the position and navigation information and the image information to obtain a combined information, and outputs the combined information to a register, an interface circuit, and/or said display monitor.

19. The apparatus of claim 16, wherein said position resolving and image digital signal processing unit offers the function of encryption.

20. A portable digital photographing and positioning apparatus for combining position navigation information and image information, comprising a portable digital photographing apparatus having a display screen;

a position information receiver for capturing position information at location of said portable digital photographing apparatus and for capturing navigation information around the location; and a position resolving and image digital signal processing unit;

wherein said position resolving and image digital signal processing unit processes the position and navigation information received by said position information receiver;

said position resolving and image digital signal processing unit processes the image information captured by said portable digital photographing apparatus;

said position resolving and image digital signal processing unit combines the position and navigation information and the image information to obtain a combined information, and outputs processed information to a register, an interface circuit, and/or said display monitor; and the portable digital photographing and positioning apparatus is loaded with an electronic map software, the processed combined information is then displayed through said display screen in accordance with the correspondent electronic map.

* * * * *